(12) United States Patent
Ackerman et al.

(10) Patent No.: US 8,069,443 B2
(45) Date of Patent: Nov. 29, 2011

(54) TECHNIQUES FOR PROVIDING SERVICES AND ESTABLISHING PROCESSING ENVIRONMENTS

(75) Inventors: Mark D. Ackerman, Eagle Mountain, UT (US); Stephen R. Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 1289 days.

(21) Appl. No.: 10/880,224

(22) Filed: Jun. 29, 2004

(65) Prior Publication Data

US 2006/0031845 A1 Feb. 9, 2006

(51) Int. Cl.
*G06F 9/455* (2006.01)
(52) U.S. Cl. .......................................................... 718/1
(58) Field of Classification Search ........................ 718/1
See application file for complete search history.

(56) References Cited

U.S. PATENT DOCUMENTS

| 6,044,217 A | 3/2000 | Brealey et al. ................. 395/701 |
| 6,078,743 A | 6/2000 | Apte et al. ..................... 395/701 |
| 6,609,246 B1 | 8/2003 | Guhr et al. ..................... 717/103 |
| 6,662,357 B1 | 12/2003 | Bowman-Amuah .......... 717/120 |
| 6,718,534 B1 | 4/2004 | Carter et al. ................... 717/100 |
| 7,194,628 B1 * | 3/2007 | Guthery ........................ 713/168 |
| 7,216,160 B2 * | 5/2007 | Chintalapati et al. ......... 709/224 |
| 2002/0069369 A1 * | 6/2002 | Tremain ......................... 713/201 |
| 2004/0015966 A1 * | 1/2004 | MacChiano et al. .............. 718/1 |
| 2004/0068726 A1 * | 4/2004 | Levy et al. ........................ 718/1 |
| 2005/0160413 A1 * | 7/2005 | Broussard et al. ............ 717/148 |
| 2005/0240828 A1 * | 10/2005 | Rothman et al. ................ 714/43 |

OTHER PUBLICATIONS

Dynamic Virtual Cluster in a Grid Site Manager J. Chase, D. Irwin, L.Grit, J. Moore and S. Sprenkle IEEE, 2003.*
Sunderam, Vaidy, et al., "Lightweight Self-Organizing Frameworks for Metacomputing", *ISBN 0-7695-1686-6. High Performance Distributed Computing, 2002. HPDC-11 2002. Proceedings, 11th IEEE International Symposium.*, Jul. 23-26, 2002, Piscataway, NJ. XP 0769516866,(Jul. 23, 2002), pp. 113-122.

* cited by examiner

*Primary Examiner* — Meng An
*Assistant Examiner* — Mengyao Zhe
(74) *Attorney, Agent, or Firm* — Schwegman, Lundberg & Woessner, P.A.

(57) ABSTRACT

Techniques are provided for the delivery of client services and for the establishment of client processing environments. A client receives services within a processing environment which is defined by a processing container. The processing container includes one or more processing groups, and each processing group has a particular context that supports one or more applications or services which are processing within that context. The processing groups communicate with one another via connector interfaces included within the processing container. Services and processing containers can be dynamically added or removed from the processing container.

24 Claims, 4 Drawing Sheets

TECHNIQUES FOR PROVIDING SERVICES AND ESTABLISHING PROCESSING ENVIRONMENTS

FIELD OF THE INVENTION

The invention relates generally to networking and more specifically to techniques for providing client or server services and establishing processing environments for clients or servers over a network.

BACKGROUND OF THE INVENTION

Attempts have been made to integrate software over the Internet, such that services need not physically reside or be installed on a client in order for a client to acquire, process, and benefit from those services. In some cases, the client dynamically acquires the services and locally processes them. This technology is nascent and is gradually beginning to gain ground in the industry. The basic idea is that services are registered, located, acquired, and processed on demand. Services may be processed local to the client or remote from the client.

The idea of creating an integrated Development Environment (IDE) has been around for some time and recent developments have held some promise that at these technologies will catch on and eventually become pervasive. Largely, efforts to integrate services has been slow, since in most instances each service needs to abstract its own interfaces and make them available for use by a variety of other services. Additionally, the services themselves must be available to process on a variety of operating system (OS) platforms. Consequently, making legacy services available in an IDE has been and continues to be problematic. Thus, services are still largely provided via dedicated servers or as appliances. That is, developers continue to view services as either an appliance application or as a server application.

One problem with the newer and older IDE models for providing services is that any particular client is difficult to manage and support, because the client's services which may originate from a variety of disparate platforms. In fact, the services may not even be within the management control of an administrator for a particular client. Additionally, some client services may not be compatible or interface with other client services.

Accordingly, management and integration has been more easily achieved with physical hardware, such as servers that are integrated in a rack with one another. However, physical devices require a definite physical location, have moving parts that can break, and cannot be easily transported from place to place as needed. The benefits of having services within a client's physical environment are that the services can be centrally managed, distributed, and controlled by administrators. Another significant benefit is that security can be better enforced in a centrally distributed physically controlled processing environment.

In fact, a more optimal solution to an IDE is a technique that is capable of centrally managing client services as if they were being locally stored and administered while at the same time having no requirement that those services be associated with traditional servers or appliances.

Correspondingly, techniques are described herein for providing services and establishing processing environments over a network, where these techniques are capable of being centrally controlled, managed, and administered.

SUMMARY OF THE INVENTION

In various embodiments of the invention, techniques are presented for establishing client processing environments and for delivering services to the client. A processing container defines a plurality of unique processing contexts, which represent processing groups. Applications process within the contexts. Communication between different contexts of the processing container is achieved via one or more connector interfaces.

More specifically, and in one embodiment, a method for establishing a processing environment is presented. A processing container is configured on one or more processing devices. One or more processing groups are configured within the processing container, where each processing group has a unique context. One or more applications are loaded within each processing group's context and a processing environment established. The processing environment has the one or more applications processing within their respective processing group's context and within the container.

DETAILED DESCRIPTION OF THE INVENTION

In various embodiments of the invention, the phrase "processing container" is used. A processing container is a logical environment, such as a virtual machine, logical network, or a logical rack ("soft rack") that holds and processes a variety of logical devices. These devices are actually processing groups, such that each processing group has a unique processing context which supports processing specific applications requiring the unique context. The term application is synonymous herein and below with the term service. The processing groups are similar to server blades that are designed to perform specific services and are installed in racks having a plurality of other blades. In this sense, the processing groups can be viewed as "soft blades."

Thus, with embodiments of this invention, the processing container and its processing groups are logical or virtual associations that are not tied to any particular physical location or hardware device. Accordingly, a processing container and its processing groups are hardware and location independent.

Each processing group includes one or more connector interfaces, the connector interfaces permit one processing group to interface and communicate with another different processing group of the processing container. Connector interfaces are aware of the applications processing within their respective processing groups and understand what types of output the applications produce and what types of input the applications require for processing. In this way, the connector interfaces can interface between applications having context in one processing group of the processing container with different applications having different contexts in different processing groups. It is noted, that in the present described arrangement the applications themselves need not be aware of the processing container, the connector interfaces, and the processing groups. That is, legacy and existing applications can be installed as soft blades and processed within particular processing groups of a processing container.

In one embodiment, the techniques presented herein are incorporated into network arrangements and products. These techniques create processing environments for clients of a network and define how services are delivered, processed, and interact with one another for any particular client. The techniques provide for centralized management and integration of distributed services.

It should be noted that a client can also be a server in any particular context. That is, a single client can serve as a server device for a plurality of other clients or servers. Thus, the use of the term client is not restricted to an end-user's processing device, and the term client is synonymous with server as used herein and below.

Figure 1:
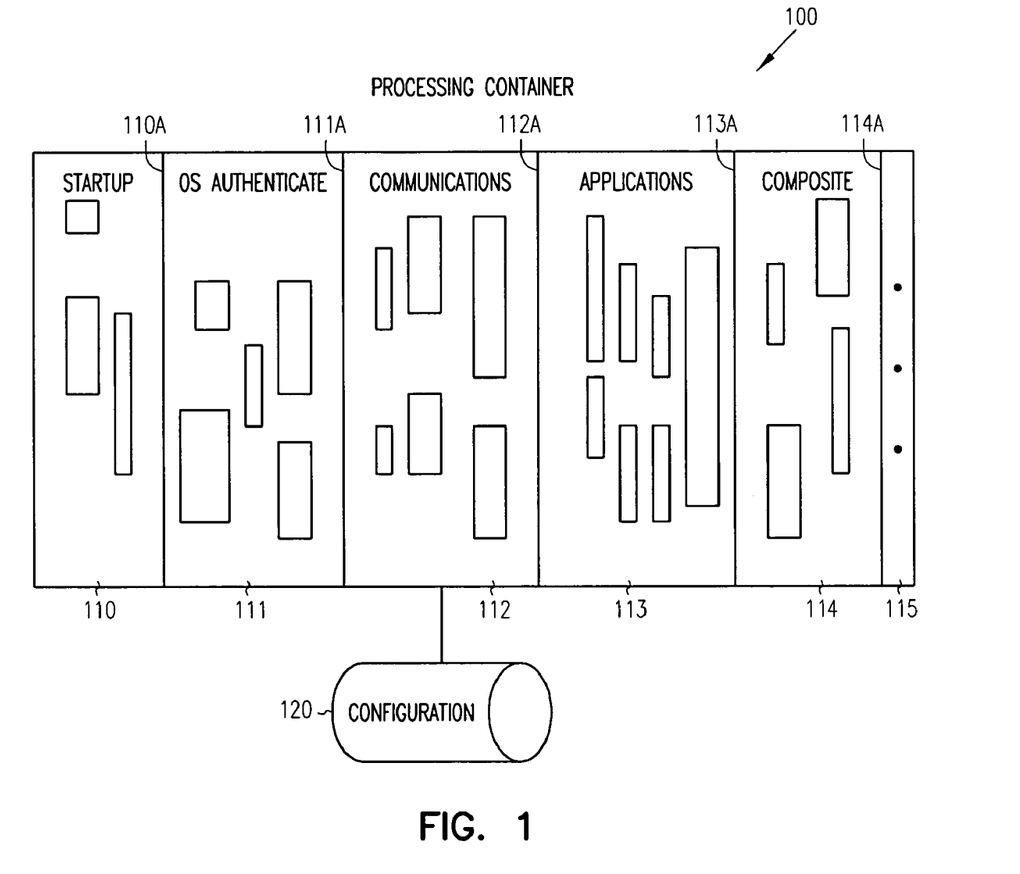
FIG. 1 is diagram of a processing architecture, according to an example embodiment of the invention.

FIG. 1 is an example processing architecture 100 for providing services and establishing processing environments, according to an example embodiment of the invention. The architecture 100 is presented for purposes of illustration only, since one of ordinary skill in the art readily appreciates that other configurations can be achieved without departing from the teachings that are presented herein and below. The processing architecture 100 (herein after "processing container") provides a logical processing environment for one or more clients of a network.

The processing container 100 includes a plurality of processing groups 110-115; each processing group having one or more connector interfaces 110A-114A (may be depicted as a group of plugs, in a certain other configurations). The processing container 100, the processing groups 110-115, and the connector interfaces 110A-114A are defined via a configuration 120. The configuration 120 can be represented in formal languages, such as Extensible Markup Language (XML), and other configuration data.

The processing container 100 is broken up into a series of contextually similar regions. Each of these regions represents one of the distinct processing groups 110-115. Within each processing group 110-115 there are a number of rectangular boxes, these boxes are intended to graphically represent applications that are available within that particular processing group 110-115. A particular application has context and can process within its assigned processing group 110-115.

As an example, consider that the "startup" processing group 110 includes a number of applications related to Power-On Self-Test (POST) diagnostics. These applications perform startup diagnostics to ensure that the processing container 100 is initialized and processing properly when a client starts up. Other applications within the startup processing group 110 might include Kernel operations for determining load, memory usage, etc. The OS Authenticate processing group 111 may include a myriad of authentication applications, such as on-box authentication, off-box authentication, trust authentication, public-private key pair authentication, password authentication, biometric authentication, and the like.

Continuing with the present example, the Communications processing group 112 may include applications for layer 0 communications, layer 1 communications, layer 2 communications, etc. The Applications processing group 113 may include word processing applications, spreadsheet applications, statistical applications, and the like. The Composite processing group 114 includes applications or systems that are more complex and may interact with various other processing groups 110-115. A Composite processing group 114 may include a Virtual Private Network (VPN) application, a Content Distribution Network (CDN) application, proxy applications (forward, reverse, transparent, etc.) and the like. A Composite group 114 application interacts with one or all the other processing groups 110-115. However, it should be noted that each of the processing groups 110-115 are capable of communicating with other processing groups 110-115; thus, a composite group 114 is not the only processing group 110-114 with this capability. There is no limit to the number and types of processing groups 110-115 which may populate a processing container 100, thus other processing groups 115 can be established within the processing container 100.

Each processing group 110-115 can interact with other processing groups 110-115 via connector interfaces 110A-114A. The connector interfaces 110A-114A are defined in the configuration 120 and may be expressed in XML, Simple Object Access Protocol (SOAP), Remote Procedure Calls (RPC), etc. In other embodiments, the connector interfaces 110A-1145A can be expressed as configuration or initialization files (e.g., ".conf" or ".ini"). A connector interface defines common events, parameters, and output of the processing groups 110-115. This can be used by the processing groups 110-115 to interface with one another and convert or translate data from one application in one processing group 110-115 to different data consumed by a different application in a different processing group 110-115. The connector interfaces 110A-114A provide for interaction of an operation for the processing container 100.

In one embodiment, the connector interfaces 110A-114A are Application Programming Interfaces (APIs) or protocols associated with the individual applications, which permit the input and output of the applications to be communicated generically within the processing groups 110-115. The configuration information 120 then permits the generically expressed data to be communicated to other connector interfaces 110A-114A for purposes of performing some operation within the processing container 100.

The processing groups 110-115 are designed to provide a service or a combination of services. Thus, these processing groups 110-115 may perform a function, provide a function, or in some cases provide resource specifications. For example, a processing group 110-115 may add a user limit to a mail system, such that a previous soft limit for total number of users on an electronic mail system is dynamically increased. As another example, a licensing processing group 110-115 may evaluate and enforce licensing restrictions for a variety of other processing groups 110-115.

The processing container 100 does not need to reside on a single processing device (although in some embodiments it can). That is, the processing container 100 is logical and is driven by the configuration 120 and can be distributed across a variety of devices over a network. Any particular client's processing environment is defined by its configuration 120 and corresponding processing container 100. Clients dynamically add and remove services (processing groups 110-115) by adjusting their configurations. Services are integrated and distributed via the processing container 100. This permits centralized management and distribution of services in a logical fashion in much the same way services have previously been administered in a physical fashion, although without the previous limitations associated with physical configurations and physical devices (e.g., servers and appliances).

Figure 2:
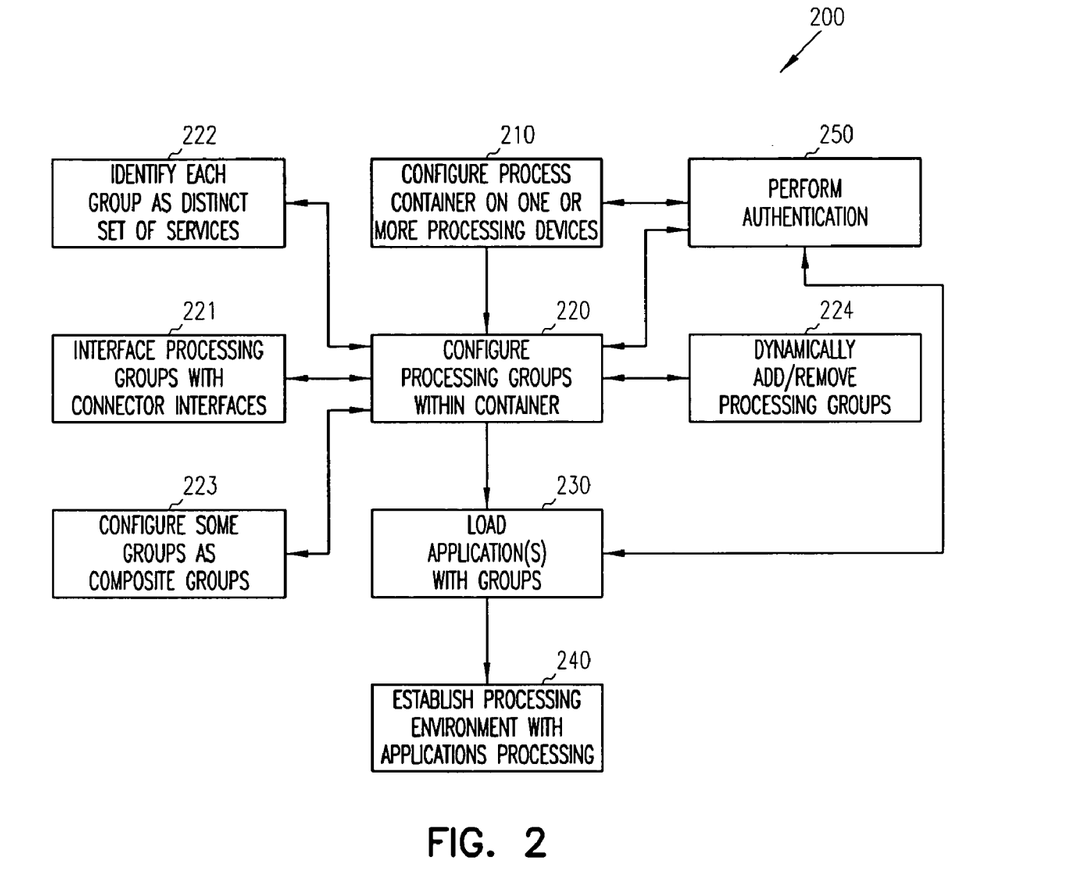
FIG. 2 is a flowchart representing a method for establishing a processing environment, according to an example embodiment of the invention.

FIG. 2 is a flowchart of a method 200 for establishing a processing environment for a client over a network. The method 200 (hereinafter "processing") is implemented in a machine-readable and accessible medium. In one embodiment, the processing is a driver application that processes on the client or on a server on behalf of the client. The driver application consumes configuration data and operations of the client in order to process services on behalf of the client. The actual physical location of the services can vary and in many instances is remote from the client and the driver application. In one embodiment, the processing utilizes the architecture 100 of FIG. 1.

Initially, at 210, a processing container is configured for a client on one or more processing devices. In one embodiment, the processing container is wholly contained on a client appliance device. In an alternative embodiment, the processing container is distributed across a variety of processing devices over a network; one of these devices may also include the client appliance device. In one embodiment, the processing container is configured over devices that are distributed over multiple networks, such as a Local Area Network (LAN) and a Wide Area Network (WAN, e.g., Internet). In one embodiment, the processing container is configured based on configuration data provided for defining the processing container.

At 220, processing groups within the processing container are configured. Each processing group has a particular processing context and is designed to provide a particular service or suite of similar services to the client. At 221, the processing groups are interfaced to and include one or more connector interfaces. The connector interfaces are APIs or protocols that permit interaction with applications included within each of the processing groups. In some cases, these APIs or protocols abstract and normalize communications occurring within any particular processing group into a generic set of data that can be processed and recognized by other APIs and protocols associated with other connector interfaces of the processing container.

At 222, in some embodiments, each processing group is identified during configuration as a distinct set of services. Moreover, at 223, some of the processing groups can be identified as composite processing groups or services. This means that the composite processing groups include a variety of services and may interact with a variety of other processing groups and their contexts. Example composite processing groups can include VPNs, CDNs, forward proxies, transparent proxies, reverse proxies, and the like.

At 224, during operation of the processing container where applications are processed on behalf of a client, a number of the processing groups can be dynamically added to or removed from the processing container. In this manner, a client's processing environment can be dynamically administered on its behalf without having to shut down the client and restart it, which has conventionally been the case.

At 230, a variety of applications are loaded into each of the processing group's contexts. Each application loaded within a particular processing group is associated with a type of service (e.g., communication, application, composite). Thus, each application has context to process within in a certain processing group. Assignment of an application to a processing group can be achieved via configuration data that identifies the application and its processing group within the processing container.

Once the processing container and the processing groups are configured and the applications loaded into their proper processing group contexts; a processing environment is fully established for a client, at 240. The client is now free to interact with its services (processing groups) and interaction across processing groups is achieved via the connector interfaces.

The processing environment established by the processing container presents a number of novel benefits. For example, a client may purchase a service, such as a composite processing group representing a transparent proxy where initially the client only desires minimal features of the proxy, such as access control to external web sites. As the client's needs increase, other features of that transparent proxy can be activated or augmented with other services in a dynamic fashion. For example, the transparent proxy may add VPN and CDN services. Of course a variety of other examples are possible with the processing container and all such variations are intended to fall within the generous scope of this invention.

Moreover, during any particular processing point associated with method 200 of FIG. 2, authentication can be enforced at 250. Thus, the initial client processing container can use authentication, the processing groups can use authentication, and the loaded applications can use authentication. This permits security to be flexibly enforced, such that even though the processing container is logical and distributed it can be authenticated and each of its components can be authenticated based on the desires of a network administrator. In fact, the authentication technique can itself be a processing group and a service to the client within the processing container.

Figure 3:
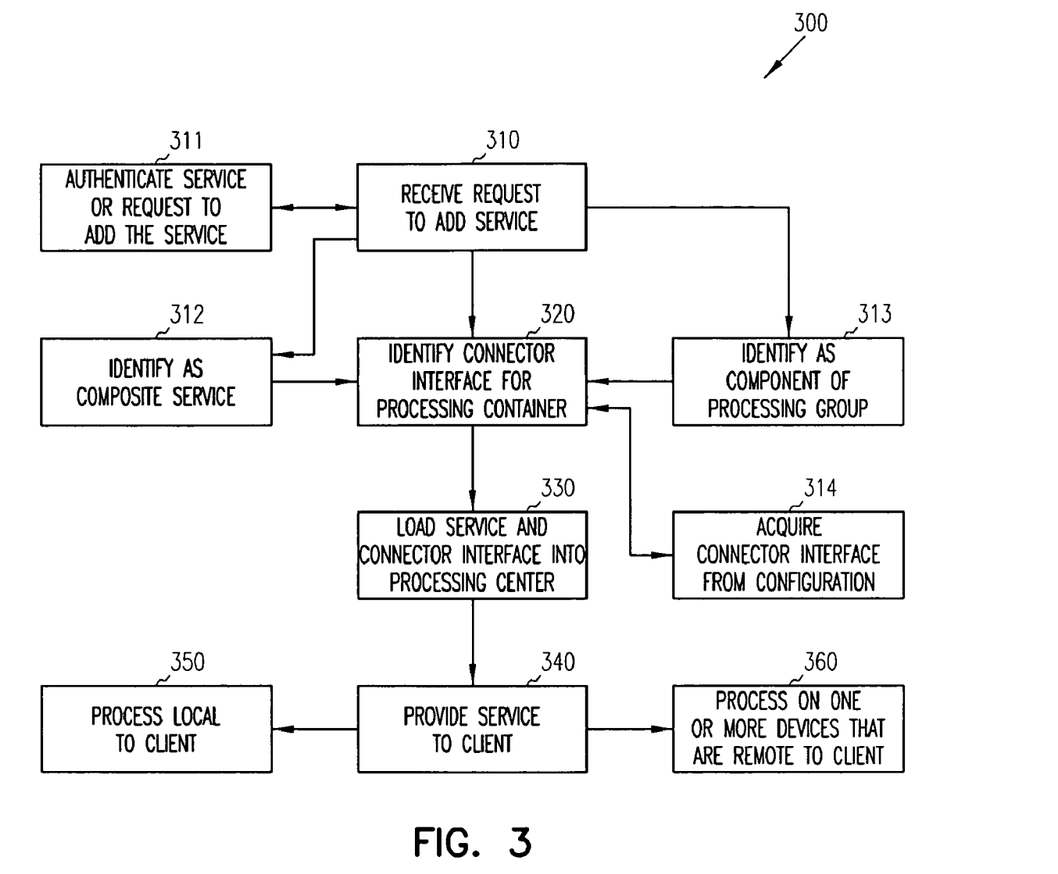
FIG. 3 is a flowchart representing a method for providing a service to a client, according to an example embodiment of the invention.

FIG. 3 is a flowchart of a method 300 for providing a service to a client over a network. The method 300 (herein after "processing") is implemented in a machine-readable and accessible medium and is accessible over a network. In one embodiment, the method 300 utilizes the processing of method 200 of FIG. 2 and the underlying architecture 100 of FIG. 1. The processing represents one aspect of how a client dynamically requests a new service within its processing environment via a processing container.

Initially, a client is processing within an environment that was established in manners described above with respect to method 200 and FIG. 2. That is, the client's processing environment is defined and driven by a processing container. At some point during the client's processing, the client requests, at 310, that a new service be added to its processing container. In some embodiments, at 311, this new service or the request itself can be authenticated by another service included within the client's existing processing container. The request is not honored and the new service not added to the client's processing container if they are not properly authenticated. In another embodiment, the processing container's configuration data may require that client requests or new services be authenticated, and the processing container may actually perform the authentication used.

In some embodiments, at 312, the requested service is identified as a composite service (e.g., VPN, CDN, forward proxies, transparent proxy, reverse proxy, etc.). In other embodiments, at 313, the requested service is identified as a component of a processing group, where that processing group is itself a service. In other words, the requested service may be a component (new feature) of an existing service.

At 314, once the service is identified a connector interface is acquired for that service. In some cases, this connector interface is defined in structured manner and represented in XML, SOAP, RPC, ini files, conf files, etc. The connector interface is an API or protocol that permits interaction with the service. The API also abstracts the interaction into a generic format that can be communicated within the processing container between services (processing groups). In this manner, the requested service, which is being added, is integrated within the processing container. Any cross interaction between disparate services represents an operation or function of the processing container.

Once the proper connector interface and new service are identified, the service and its connector interface are loaded into the processing container at 330. At this point, the new service is ready for use by the client. The new service was dynamically installed by the processing and the client did not require a shut down before that new service was fully available for use by the client.

In one embodiment, the initial request received for the service by the client may in fact be a generic query for a generic service. The processing can interact with other services to execute that query and locate a suitable service which satisfies the client's request. For example, the client may request a service for performing statistical processing; in response to this request, the processing locates a suitable service, such as SAP, based on the configuration of the client's processing container. The SAP is then acquired (perhaps purchased using another processing container service) and loaded into the client's processing container.

Once the requested service is loaded into the client's processing container, the service is provided to the client at 340. In some cases, this may mean that the service is processed locally on an appliance of the client at 350. In other cases, this may mean that the service is processed on one or more devices that are remote and external to the client at 360. The remote processing of the requested service can occur on devices within the client's LAN or can occur on devices that are external or remote to the client which exist on a WAN (e.g., Internet).

In some embodiments, a client's request for a service may be associated with a service that already exists within the client's processing container but has not yet been activated. This may be a configuration established by a vendor of a service or by an administrator of the client. It may be done for purposes of efficiency or for purposes of easy installation and access to the service when dynamically desired by the client. In these embodiments, the service does not have to be acquired before it is loaded; it is just dynamically activated with a key, such as a licensing key and the like.

Figure 4:
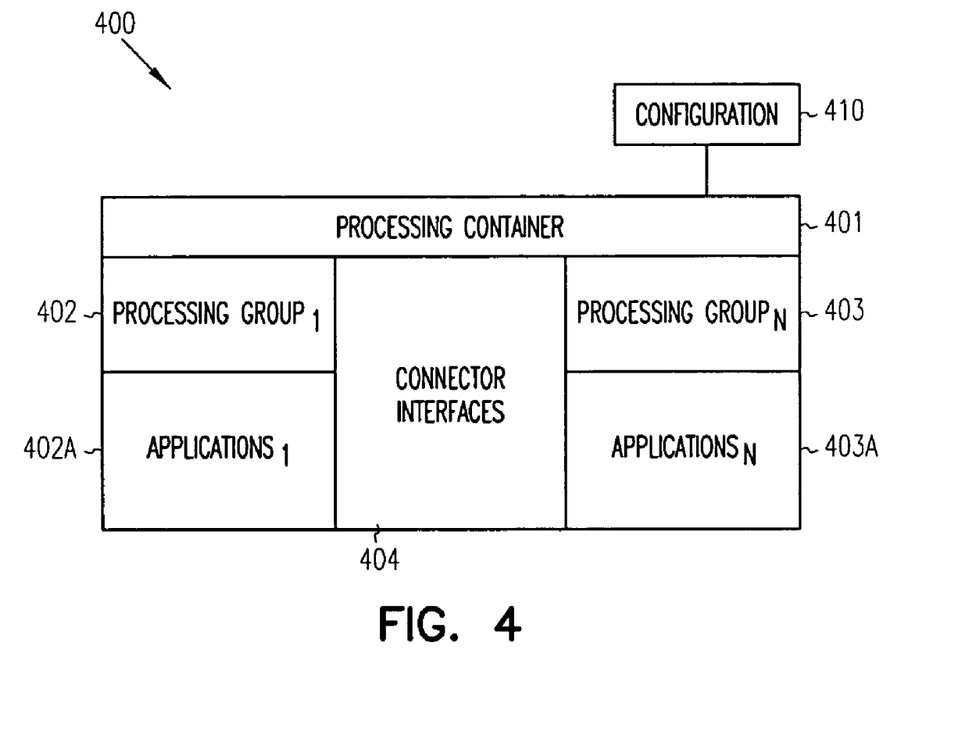
FIG. 4 is a diagram representing a processing system, according to an example embodiment of the invention.

FIG. 4 is a diagram of a processing system 400, according to an example embodiment of the invention. The processing system 400 is implemented in a machine-accessible and readable medium and is processed over a network. In one embodiment, the processing system 400 is initially established and interacted with in the manners described above with respect to methods 200 and 300 of FIGS. 2 and 3, respectively.

It is noted that FIG. 4 is presented for purposes of illustration and comprehension and that the processing system 400 does not have to be contiguously contained within any single processing device. That is, the processing system 400, in some embodiments, is distributed across a plurality of processing devices and logically associated and controlled by methods similar to methods 200 and 300 of FIGS. 2 and 3, respectively.

The processing system 400 includes a processing container 401, one or more processing groups 402-403, and one or more connector interfaces 404. Each processing group 402 or 403 includes applications 402A and 403A, respectively. The applications 402A and 403A combine within their respective processing groups 402 and 403 to provide a service or set of similar services to a client within each unique processing group 402 or 403.

The processing groups 402 and 403 represent contexts within the processing container 401. Certain applications 402A and 403A are operable to be processed within their contexts but not outside their contexts. Each processing group 402 and 403 can communicate with its applications 402A and 403A and with other processing groups 402 and 403 via the connector interfaces 404.

The connector interfaces 404 are APIs or protocols which permit interaction with the applications 402A and 403A via the processing groups 402 and 403. By interaction it is meant that input and output data associated with the applications 402A and 403A can be interpreted and provided via the connector interfaces 404. The input and output data can be normalized or made generic and communicated to other connector interfaces 404, where it can be communicated to other applications 402A and 403A. Thus, the connector interfaces 404 serve as bridges for integrating the applications 402A and 403A. It should be noted, that the applications 402A and 403A themselves may not need to be modified to be integrated into the processing container 401; rather, a specialized connector interface 404 can be provided to integrate a particular application 402A and 403A, if desired.

In some embodiments, the processing system 400 includes configuration data 410. The configuration data defines the processing container 401, the processing groups 402 and 403, the applications 402A and 403A, and the connector interfaces 404. In order, to remove or add processing groups 402 and 403, applications 402A and 403A, and connector interfaces 404 the configuration data 410 is modified to reflect the change and a driving application, such as the one described above with respect to methods 200 and 300 of FIGS. 2 and 3, respectively, interprets the configuration data 410 changes and enforces the changes within the processing container 401.

Some processing groups 402 or 403 can be composite processing groups having one or more processing groups 402 and 403 logically associated with one another or integrated with one another. For example, a composite processing group might be a VPN, CDN, forward proxy, transparent proxy, reverse proxy, etc. Additionally, in some embodiments, the some processing groups 402 or 403 may be initially installed and available within the processing container 401, but may be initially inactive (not available for use by a client). These inactive processing groups 402 or 403 can be dynamically activated based upon a predefined event, such as a license being acquired by the client, a purchase made by the client, or a request for the processing group 402 or 403 being made by the client.

During operation of the processing system 400, the processing container 401 defines a processing environment for a client. The client adds, removes, and receives services (processing groups 402 and 403) via the processing container 401. Management of the client's processing environment is achieved by managing the configuration data 410 associated with the processing container 401, the processing groups 402 and 403, the applications 402A and 403A, and the connector interfaces 404. The client's processing groups 402 and 403 may have applications 402A and 403A that process local to or on a client appliance processing device or that process on remote processing devices that are within the client's LAN or external to the client over a WAN.

Figure 5:
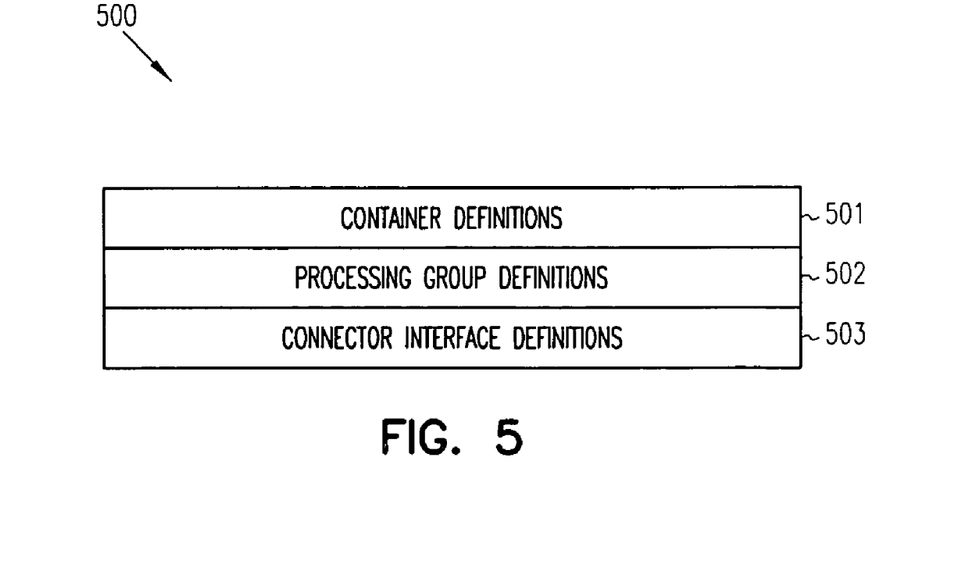
FIG. 5 is a diagram representing configuration information that defines a processing environment, according to an example embodiment of the invention.

FIG. 5 is a diagram of configuration information 500 for defining a client's processing environment. The configuration information 500 is implemented and resides in a machine-accessible and readable medium. In one embodiment, the configuration information 500 is the configuration data described above and consumed within methods 200 and 300 of FIGS. 2 and 3, respectively, and system 400 of FIG. 4.

The configuration information 500 includes processing container definitions 501, processing group definitions 502, and connector interface definitions 503. The container definition 501 defines the rules associated with a processing container. A processing container includes a plurality of processing groups and connector interfaces. The processing groups have applications that combine to provide a service or set of similar services to a client. The connector interfaces are APIs or protocols (e.g., XML, SOAP, RPC, etc.) that permit processing groups to interact with their applications and with other processing groups. The connector interfaces bridge or integrate the processing groups within the processing container.

The processing group definitions 502 represent a processing context for the processing container. That context supports predefined types of applications and services. In some instances a single processing group definition 502 represents a composite processing group that has two or more processing groups included therein, such as a VPN, CDN, proxy services, etc.

The connector interface definitions 503 represent APIs or protocols that permit the processing groups to interact with their applications and abstract information or data into generic formats that can be communicated to other processing groups which interact with other applications. Thus, the connector interfaces are communication bridges within the processing container. The applications provided within any particular processing group do not have to be modified to be integrated with the teachings of this invention.

That is, legacy applications can be easily and seamlessly integrated into processing containers of the present invention. This can be achieved by adding small connector interfaces and connector interface definitions 503 to the configuration information 500, where these small interfaces use the existing API of a legacy application and abstract information into generic formats for communication to other connector interfaces included within the processing container.

The configuration information 500 is consumed by a driving application, such as the ones described above with respect to the method 200 and 300 of FIGS. 2 and 3, respectively, for purposes of establishing a processing environment for a client. The processing environment is managed via the configuration information 500 and can be centrally controlled, and yet, the processing environment is fully distributed over a network and includes a variety of services some of which that are not natively compatible with one another. The new processing environment integrates the services with one another in a plug-and-play fashion and is therefore easily expandable and upgraded as the needs of the client dynamically change.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for establishing a processing environment, comprising:

configuring a processing container for processing devices that are distributed over multiple networks, the processing container defines unique processing contexts occurring within the processing devices and each processing context representing a processing group;

configuring processing groups within the processing container, each processing group having a unique context;

loading applications within each processing group's context;

establishing a processing environment having the applications processing within their respective processing group's context and within the container; and interfacing two or more of the processing groups using connector interfaces included within the processor container, and each connector interface processes for its respective processing group types of input used by each application within that processing group and types of output produced by each application within that processing group thereby permitting interfacing between the two or more processing groups, each connector interface is a protocol that defines common events, parameters, and output of that connector interface's processing group thereby permitting the processing groups to interface with one another and translate data from one application in one processing group to different data used by a different application in a different processing group; and, the processing groups perform their own authentication, each application performs additional authentication, and the processing container performs other authentication where the authentication technique used by the processing container is a particular one of the processing groups, the processing group for the authentication technique is an Operating System (OS) authentication processing group that performs on-box authentication and off-box authentication, the on-box authentication necessitates no pass through of the OS and the off-box authentication necessitates pass through of the OS to external boxes for authentication.

2. The method of claim 1 further comprising, dynamically adding one or more new processing groups having one or more new contexts within the processing container, wherein one or more new applications are dynamically loaded within the one or more new contexts.

3. The method of claim 1 further comprising, dynamically removing one or more of the processing groups from the container.

4. The method of claim 1 further comprising, authenticating at least one of the processing container, the processing groups, and the applications before configuring and loading them on the processing devices.

5. The method of claim 1, wherein configuring the processing groups further includes configuring at least one composite processing group that includes multiple ones of the processing groups.

6. The method of claim 5, wherein configuring the processing groups further includes identifying each of the groups as a separate set of related services.

7. A method for providing a service to client, comprising:

receiving a request to add a service from a client;

identifying a connector interface for the service, that interfaces the service to other connector interfaces within a processing container, the other connector interfaces are associated with other services available within the processing container, and the processing container processes on devices over multiple networks, the processing container defines unique processing contexts occurring within the devices, and the connector interface processes for the service types of input used by the service and types of output produced by the service thereby permitting interfacing between the service and the other connector interfaces, the connector interface and the other connector interfaces are Application Programming Interfaces (APIs) that permits the input and output to be generically communicated within the processing container and across the unique processing contexts; and the service and the other services use their own authentication and the processing container uses still other authentication where the authentication technique used is included within the processing container and the processing container includes an Operating System (OS) authentication processing group that performs on-box authentication and off-box authentication for the authentication technique, the on-box authentication necessitates no pass through of the OS and the off-box authentication necessitates pass through of the OS to external boxes for authentication;

loading the service and its connector interface into the processing container; and providing the service to the client.

8. The method of claim 7 further comprising, authenticating the service after receiving the request, and wherein the service is loaded if the service is authenticated.

9. The method of claim 7, wherein receiving further includes identifying the service as a composite service having two or more embedded services.

10. The method of claim 7, wherein receiving further includes identifying the service as a component within a processing group of the processing container.

11. The method of claim 7, wherein providing the service further includes processing the service on a processing device that is local to the client.

12. The method of claim 7, wherein providing the service further includes processing the service over a network from one or more processing devices that are remote to the client.

13. The method of claim 7 further comprising, acquiring a definition for the connector interface from configuration data associated with the processing container.

14. The method of claim 13 further comprising, representing the configuration data in a formal language.

15. A processing system implemented in a computer-readable storage medium and is processed over a network, comprising:

a processing container implemented as a processing environment for devices that spans multiple networks, the processing container defines unique processing contexts occurring within the devices and each processing context representing a processing group;

processing groups, each processing group having services that process on computer devices; and connector interfaces, each connector interface provides for interaction between the processing groups, and each processing group represents a different processing context within the processing container, and each connector interface processes for its respective processing group types of input used by each application within that processing group and types of output produced by each application within that processing group thereby permitting interfacing between the processing groups, each connector interface is a protocol that defines common events, parameters, and output of that connector interface's processing group thereby permitting the processing groups to interface with one another and translate data from one application in one processing group to different data used by a different application in a different processing group; and each processing group uses its own authentication, each application also uses its own independent authentication, and the processing container use still other authentication where the authentication technique used is a particular processing group within the processing container, and the processing group for the authentication technique is an Operating System (OS) authentication processing group that performs on-box authentication and off-box authentication, the on-box authentication necessitates no pass through of the OS and the off-box authentication necessitates pass through of the OS to external boxes for authentication.

16. The processing system of claim 15 further comprising, configuration data that defines the processing container, the processing groups, and the connector interfaces.

17. The processing system of claim 16, wherein a least a portion of the processing system exists on a client or server processing device.

18. The processing system of claim 15, wherein each processing group represents a context for a subset of the services.

19. The processing system of claim 18, wherein a number of the processing groups are composite processing groups having two or more of the processing groups.

20. The processing system of claim 18, wherein a number of the processing groups are inactive and not available from within the processing container until dynamically activated.

21. The processing system of claim 15, wherein the processing container performs authentication on at least one of the processing groups and the one or more services.

22. The processing system of claim 15, wherein the processing groups perform authentication on the one or more services.

23. The processing system of claim 15, wherein the processing container activates and deactivates a number of the processing groups.

24. The processing system of claim 15, wherein the processing groups activate or deactivate a number of their services.

* * * * *

UNITED STATES PATENT AND TRADEMARK OFFICE
CERTIFICATE OF CORRECTION

| | | |
|---|---|---|
| PATENT NO. | : 8,069,443 B2 | Page 1 of 1 |
| APPLICATION NO. | : 10/880224 | |
| DATED | : November 29, 2011 | |
| INVENTOR(S) | : Ackerman et al. | |

It is certified that error appears in the above-identified patent and that said Letters Patent is hereby corrected as shown below:

In column 12, line 34, in Claim 17, delete "a least" and insert -- at least --, therefor.

Signed and Sealed this
Seventh Day of February, 2012

David J. Kappos
*Director of the United States Patent and Trademark Office*